US012644555B2

(12) United States Patent
Song et al.

(10) Patent No.: US 12,644,555 B2
(45) Date of Patent: Jun. 2, 2026

(54) PIPE INSPECTION APPARATUS

(71) Applicant: KOREA GAS CORPORATION,
Daegu (KR)

(72) Inventors: Hong Seok Song, Gunpo-si (KR); Hui Ryoung Yoo, Incheon (KR); Dong Kyu Kim, Incheon (KR); Dae Kwang Kim, Incheon (KR); Jae Jun Kim, Incheon (KR); Seung Ung Yang, Incheon (KR); Kwang Hyun Yoo, Gwacheon-si (KR); Byung Taek Oh, Incheon (KR)

(73) Assignee: KOREA GAS CORPORATION,
Daegu (KR)

( * ) Notice: Subject to any disclaimer, the term of this patent is extended or adjusted under 35 U.S.C. 154(b) by 277 days.

(21) Appl. No.: 18/418,334

(22) Filed: Jan. 21, 2024

(65) Prior Publication Data

US 2024/0328561 A1      Oct. 3, 2024

Related U.S. Application Data

(63) Continuation of application No. PCT/KR2023/004235, filed on Mar. 30, 2023.

(30) Foreign Application Priority Data

Mar. 29, 2023    (KR) ........................ 10-2023-0041424

(51) Int. Cl.
F16L 55/38          (2006.01)
F16L 55/40          (2006.01)
(Continued)

(52) U.S. Cl.
CPC ............... F16L 55/38 (2013.01); F16L 55/40 (2013.01); G01N 27/82 (2013.01); *F16L 2101/30* (2013.01)

(58) Field of Classification Search
CPC ....... F16L 2101/30; F16L 55/38; F16L 55/40; F16L 55/44; G01N 27/82
See application file for complete search history.

(56) References Cited

U.S. PATENT DOCUMENTS

| | | | |
|---|---|---|---|
| 9,353,902 B2 * | 5/2016 | Early | ..................... F16L 55/265 |
| 2008/0141474 A1 | 6/2008 | Kapustin et al. | |
| 2021/0172821 A1 | 6/2021 | Pirner | |

FOREIGN PATENT DOCUMENTS

| | | | | |
|---|---|---|---|---|
| CN | 111512085 A | * | 8/2020 | ............. G01B 11/16 |
| CN | 111512085 B | * | 12/2021 | ............. G01B 11/16 |

(Continued)

OTHER PUBLICATIONS

Office Action dated Oct. 22, 2024, issued in Korean Patent Application No. 10-2023-0041424.

(Continued)

*Primary Examiner* — Kristina M Deherrera
*Assistant Examiner* — Gedeon M Kidanu
(74) *Attorney, Agent, or Firm* — PnK IP LLC

(57)          ABSTRACT

A pipe inspection apparatus is provided according to one embodiment of the present invention. The pipe inspection apparatus may include a moving body part to travel in a pipe, at least one drive cup disposed on an outer surface of the moving body part and configured to allow the moving body part to travel along an inside of the pipe due to a pressure of a fluid flowing in the pipe, at least one front guide part disposed on a front portion of the drive cup and including a front wheel that brings into contact with the pipe, and at least one rear guide part disposed on a rear portion of the drive cup and including a rear wheel that brings into contact with the pipe.

12 Claims, 7 Drawing Sheets

(51) Int. Cl.
      *F16L 101/30*          (2006.01)
      *G01N 27/82*          (2006.01)

(56)            References Cited

FOREIGN PATENT DOCUMENTS

| | | | | |
|---|---|---|---|---|
| EP | 0089738 | 9/1983 | | |
| JP | 2006068739 | 3/2006 | | |
| KR | 10-2019-0081094 | 7/2019 | | |
| KR | 10-2153521 | 9/2020 | | |
| KR | 102153521 B1 * | 9/2020 | .............. | F16L 55/40 |
| KR | 10-2022-0105077 | 7/2022 | | |

OTHER PUBLICATIONS

International Search Report of the PCT application No. PCT/KR2023/004235 dated Jul. 4, 2024.
Extended European Search Report of the PCT application No. PCT/KR2023/004235 dated Feb. 25, 2025.

\* cited by examiner

PIPE INSPECTION APPARATUS

CROSS REFERENCE TO RELATED APPLICATIONS

This application is a Bypass Continuation of International Patent Application No. PCT/KR2023/4235, filed on Mar. 30, 2023, which claims priority from and the benefit of Korean Patent Application No. 10-2023-0041424, filed on Mar. 29, 2023, each of which is hereby incorporated by reference for all purposes as if fully set forth herein.

BACKGROUND

Field

The present invention relates to a pipe inspection apparatus.

Discussion of Background

Various types of pipes, such as water and sewer pipes, urban gas pipelines, and plant pipes in petrochemical plants, are installed and used to transport fluids such as water, oil, liquefied gas, and gas in various industries. In particularly, when defects occur in pipes in which combustible or toxic materials flow, significant loss of life and property may occur, and therefore, maintenance work to check internal states should be performed every predetermined period to prevent damage caused by aging, corrosion, and external forces over time. In order to inspect the inside of these pipes, pipe inspection apparatuses, such as intelligent pigs, have been developed and used.

Generally, in order to use the conventional pipe inspection apparatus, a drive cup formed on an outer circumferential surface of a moving body seals between the pipe inspection apparatus and an inner wall of a pipe to generate a differential pressure between a front side and a rear side of the pipe inspection apparatus so that the pipe inspection apparatus travels in the pipe.

However, in the conventional pipe inspection apparatus, since the drive cup simultaneously performs sealing and attitude hold functions on the pipe inspection apparatus, there is a problem that an excessive frictional force is generated between the drive cup and the inner wall. In addition, in a composite pipe or curved pipe at which an inner diameter of the pipe is changed, there is a problem that a part of the drive cup is not in full close contact with the pipe, and thus the sealing performance is degraded.

Therefore, a pipe inspection apparatus which can solve such a problem is required.

The above information disclosed in this Background section is only for understanding of the background of the inventive concepts, and, therefore, it may contain information that does not constitute prior art.

SUMMARY

Accordingly, the present invention is directed to providing a pipe inspection apparatus in order to solve the problem.

Technical objectives of the present invention are not limited to the technical objective described above, and the other technical objectives which are not described may be clearly understood by those skilled in the art from the following descriptions.

One aspect of the present invention provides a pipe inspection apparatus. The pipe inspection apparatus includes a moving body part to travel in a pipe, at least one drive cup disposed on an outer surface of the moving body part and configured to allow the moving body part to travel along an inside of the pipe due to a pressure of a fluid flowing in the pipe, at least one front guide part disposed on a front portion of the drive cup and including a front wheel that brings into contact with the pipe, and at least one rear guide part disposed on a rear portion of the drive cup and including a rear wheel that brings into contact with the pipe.

The front guide part may include a rotary shaft of which one end is rotatably connected to the moving body part and the other end is connected to the front wheel, and a front support shaft of which one end is connected to the front wheel and the other end is connected to a front surface of the drive cup.

The rear guide part may include a rear support shaft of which one end is connected to a rear surface of the drive cup and the other end is connected to the rear wheel.

At least a part of the drive cup may be formed of an elastic material.

When an external force is applied to the front wheel, the front guide part may rotate toward the moving body part to elastically deform the at least a part of the drive cup, and the rear guide part may rotate toward the moving body part so that the front wheel and the rear wheel bring into contact with the pipe.

When an external force is applied to the rear wheel, the rear guide part may rotate toward the moving body part to elastically deform the at least a part of the drive cup, and the front guide part may rotate toward the moving body part so that the rear wheel and the front wheel bring into contact with the pipe.

The front wheel and the rear wheel may be position-restored by being rotated toward the pipe due to elastic recovery of the drive cup.

The pipe inspection apparatus may further include an elastic part which is disposed between the front guide part and the moving body part and supports at least a part of the front guide part, wherein the front wheel and the rear wheel may be position-restored by being rotated toward the pipe due to at least one of elastic recovery of the elastic part and elastic recovery of the drive cup.

The drive cup may include a coupling part coupled to a circumference of the moving body part, a plurality of body parts which extend radially rearward and outward from the fixing part and of which a front surface is coupled to the front guide part and a rear surface is coupled to the rear guide part, and a plurality of folding parts disposed between and connected to the plurality of body parts and configured to change a distance between the body parts.

The folding parts may include a first folding part and a second folding part extending rearward from two adjacent body parts, the first folding part and the second folding part may be coupled to fold forward, and end portions of the first folding part and the second folding part may protrude outward more than edges of the body parts.

A first deforming part recessed outward from one region to have a predetermined length may be formed between front surfaces of the first folding part and the second folding part, and a second deforming part recessed outward from one region to have a predetermined length may be formed between rear surfaces of the folding part and the body part.

According to the present invention, since a front wheel and a rear wheel on front and rear portions of a drive cup bring into contact with an inner wall of a pipe in conjunction with a front guide part and a rear guide part in response to changes in an inner diameter and a shape of the pipe, a frictional force can be reduced when the pipe inspection apparatus is traveling.

In addition, according to the present invention, since an inner diameter of a drive cup changes to correspond to an inner diameter of a pipe, the sealing performance can be improved, and a driving force of a pipe inspection apparatus can be improved.

In addition, according to the present invention, since a front guide part and a rear guide part return to their original positions due to elastic restoring of a drive cup, additional components and the like for the return of the front guide part and the rear guide part are not required, a weight of a pipe inspection apparatus can be reduced.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
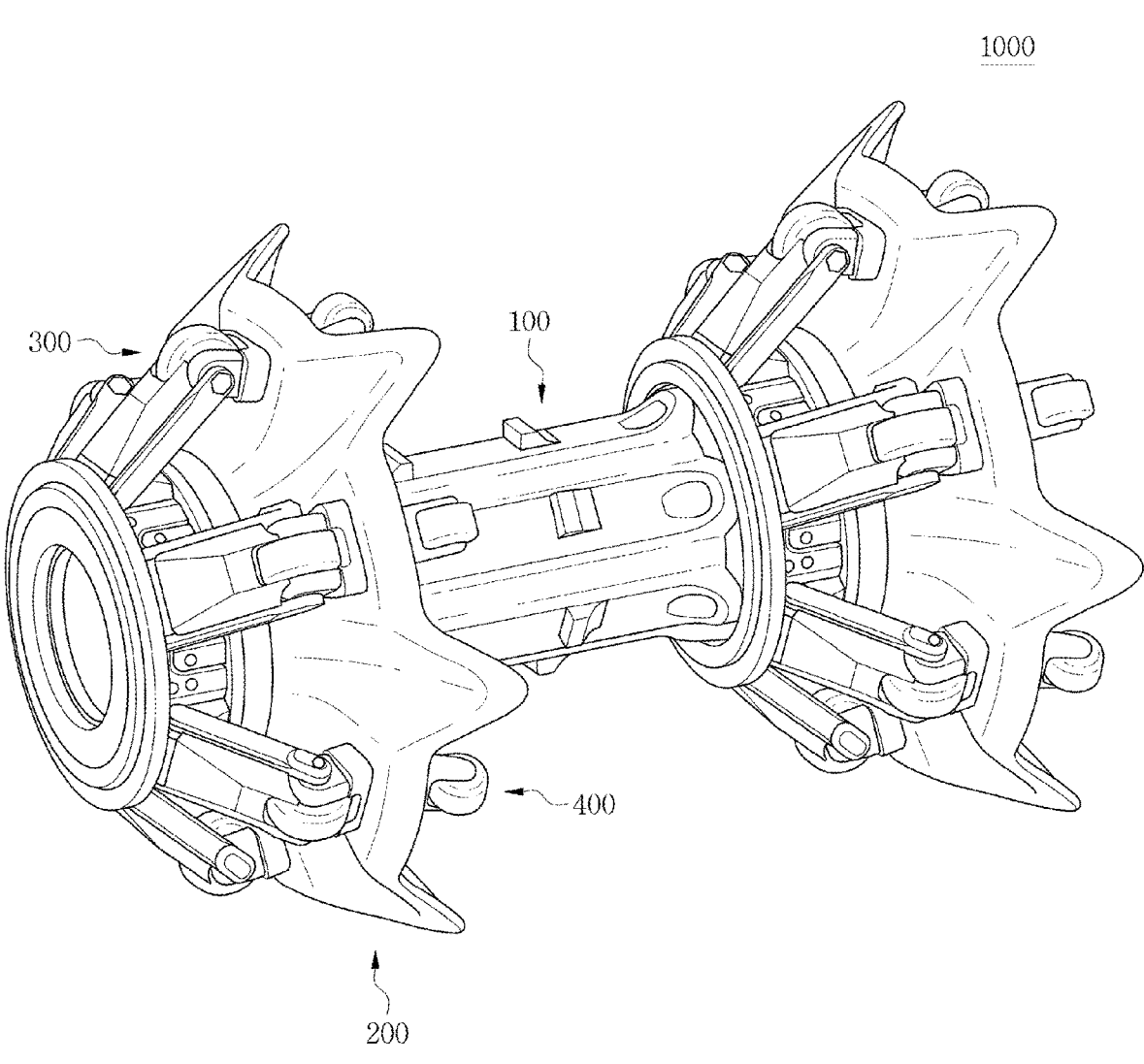
FIG. 1 is a perspective view of a pipe inspection apparatus according to one embodiment of the present invention.

Hereinafter, embodiments of the present invention will be described with reference to the accompanying drawings. When reference numerals are assigned to components of each drawing, it should be noted which, even when the same components are illustrated in different drawings, the same numerals are assigned to the same components whenever possible. In addition, in the descriptions of the embodiments of the present invention, when specific descriptions of related well-known technologies or functions are deemed to unnecessarily obscure the understanding of the embodiments of the present invention, they will be omitted. In addition, although the embodiments of the present invention will be described below, the technical spirit of the present invention will not be limited thereto and may be variously modified and implemented by those skilled in the art. Meanwhile, for the sake of convenience, upward, downward, left, and right directions, which will be mentioned below, for the sake of convenience are based on the drawings, and the scope of the present invention is not necessarily limited thereto.

Throughout this specification, when a first part is referred to as being "connected" to a second part, it includes being "directly connected" to the second part and "indirectly connected" to the second part with a third part disposed therebetween. Also, when a certain part "includes" a certain component, this does not exclude other components unless explicitly described otherwise, and other components may be further included. In addition, in descriptions of components of the embodiments of the present invention, terms such as "first," "second," "A," "B," "a," and "b" may be used. The terms are only to distinguish one element from another element, and the essence, order, number, and the like of the elements are not limited to the terms.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
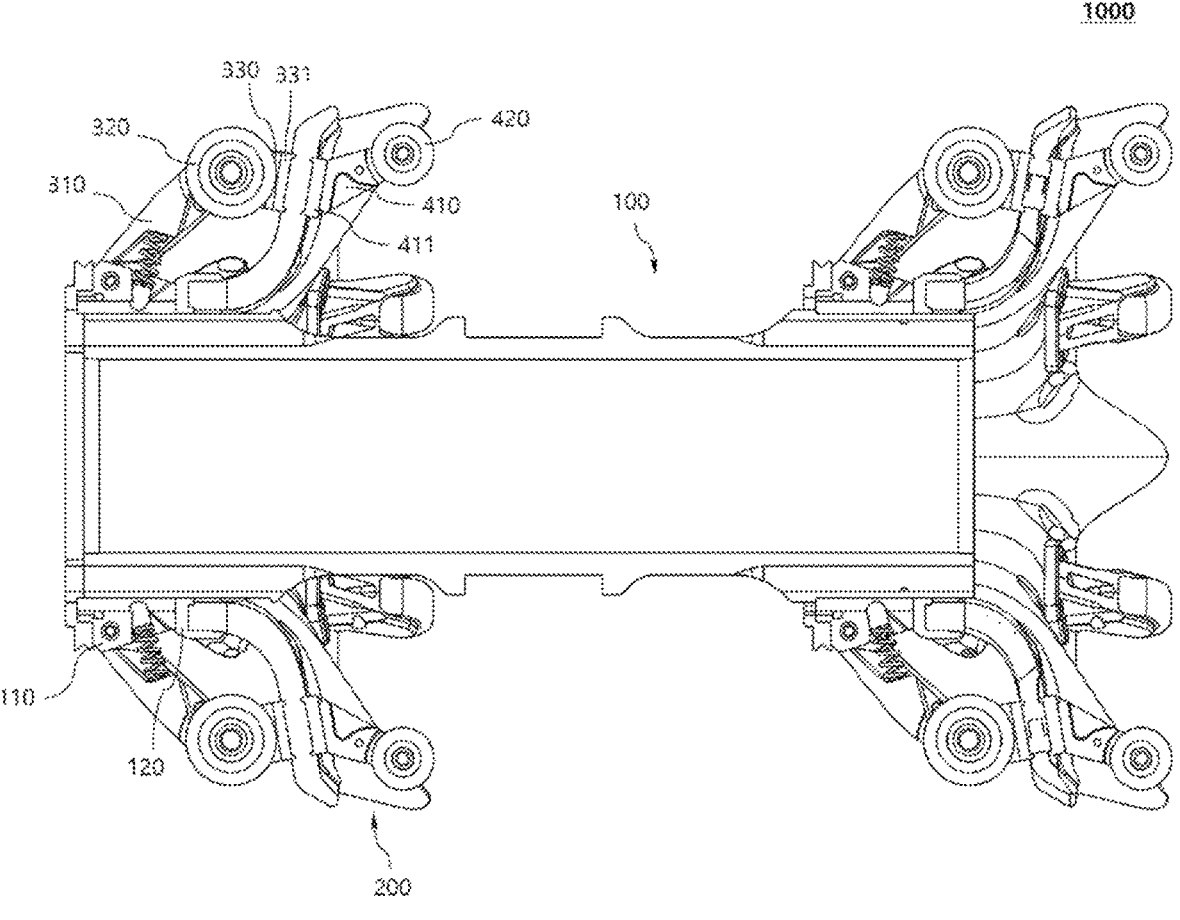
FIG. 2 is a cross-sectional view of the pipe inspection apparatus according to one embodiment of the present invention.
Figure 3:
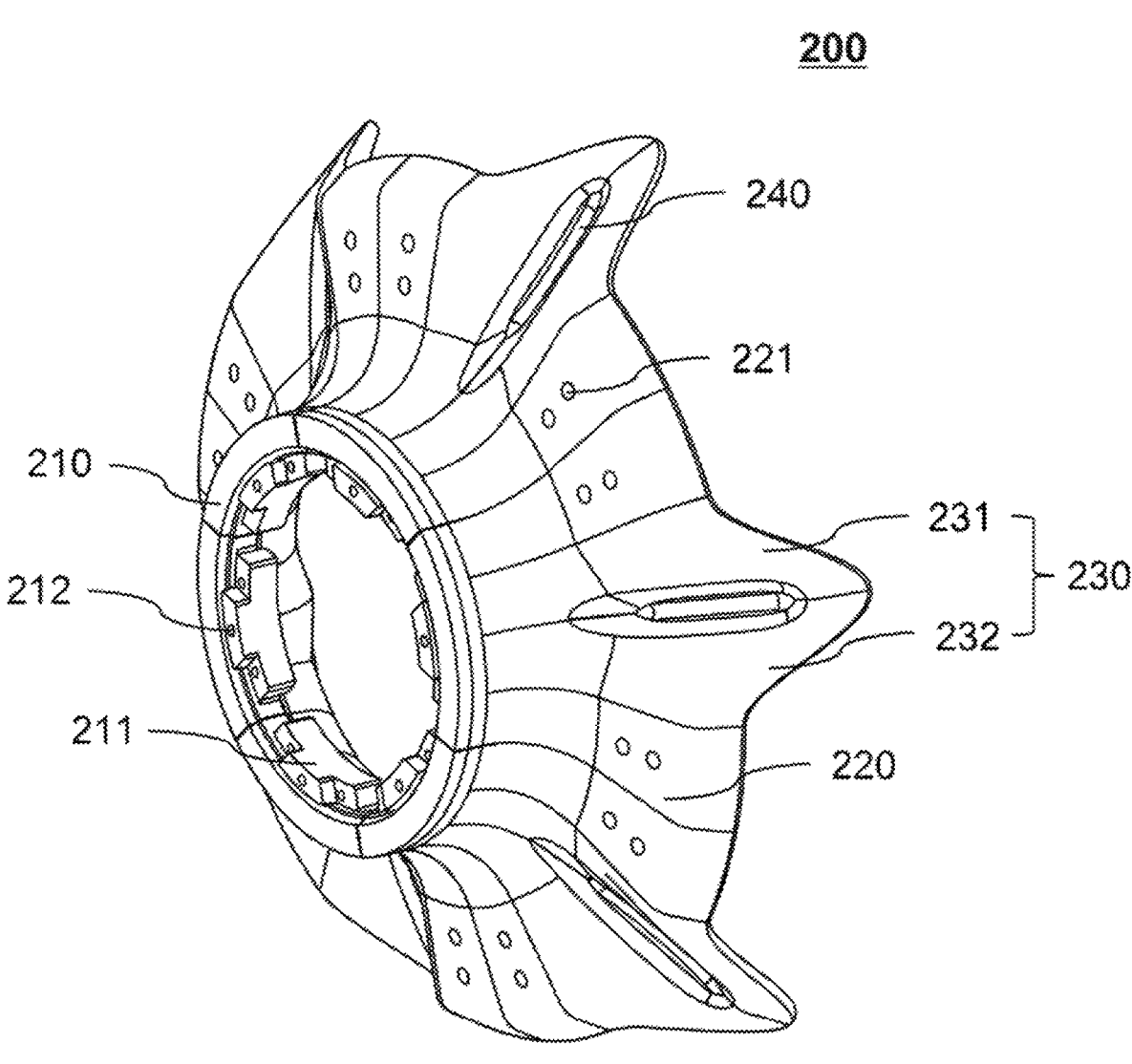
FIG. 3 is a front perspective view of a drive cup of the pipe inspection apparatus according to one embodiment of the present invention.
Figure 4:
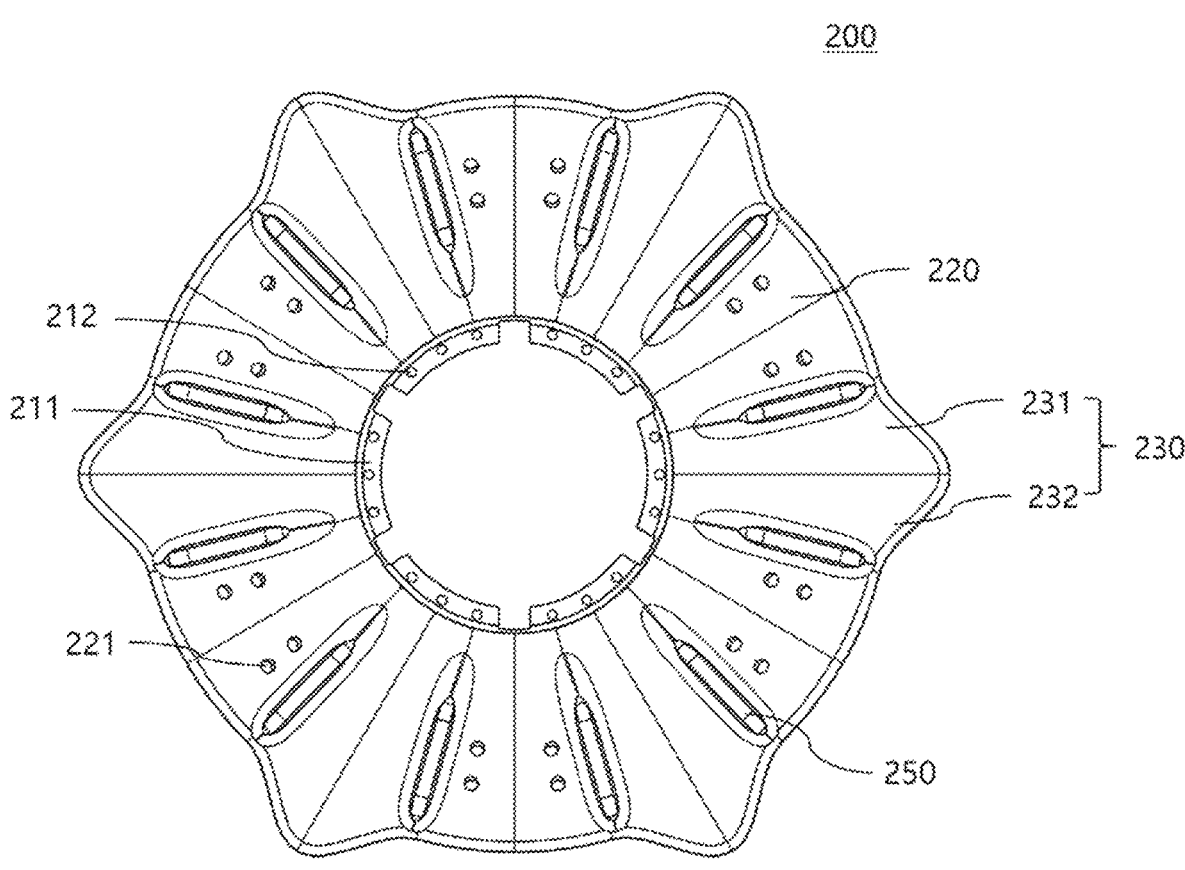
FIG. 4 is a rear view of the drive cup of the pipe inspection apparatus according to one embodiment of the present invention.
Figure 5:
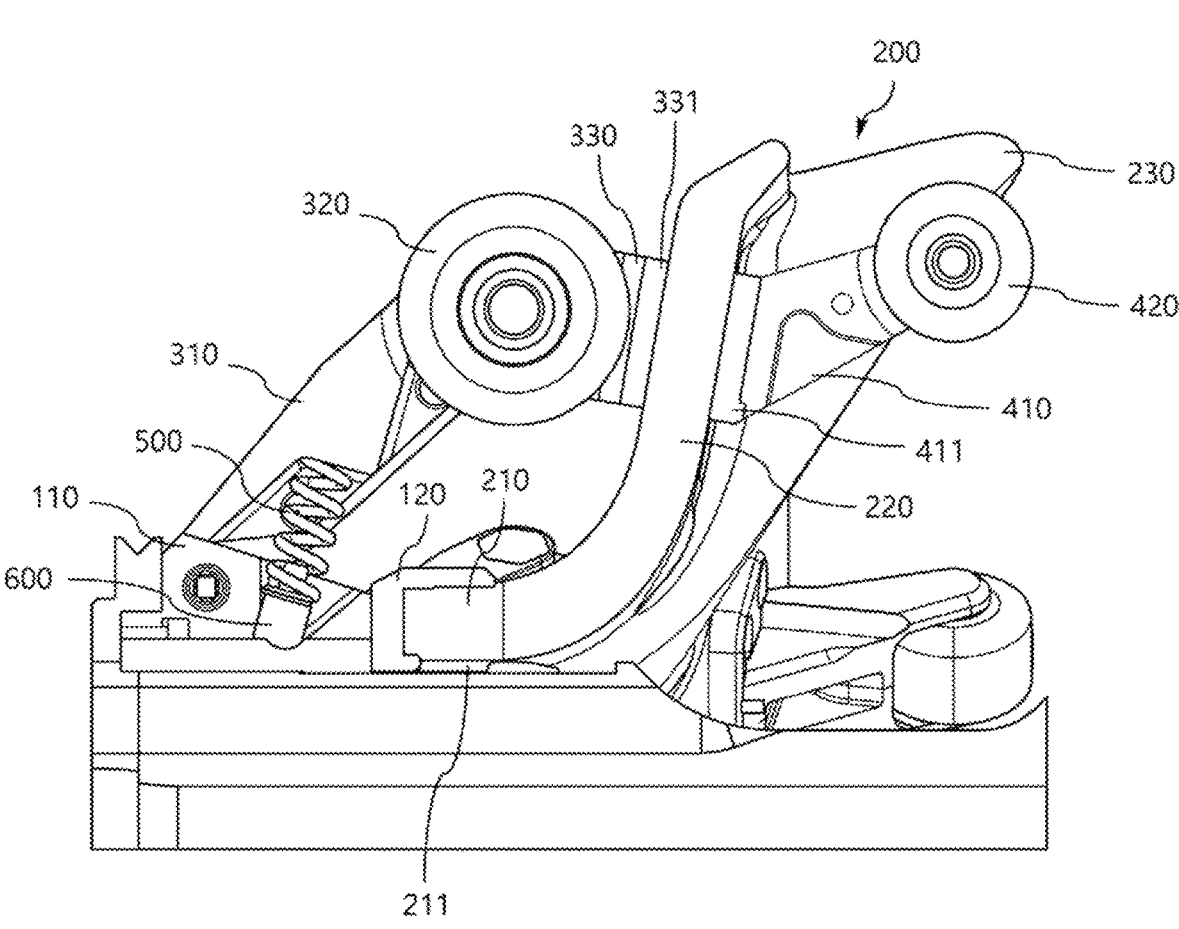
FIG. 5 is an enlarged cross-sectional view of a front guide part and a rear guide part of the pipe inspection apparatus according to one embodiment of the present invention.

FIG. 1 is a perspective view of a pipe inspection apparatus according to one embodiment of the present invention, and FIG. 2 is a cross-sectional view of the pipe inspection apparatus according to one embodiment of the present invention. FIG. 3 is a front perspective view of a drive cup of the pipe inspection apparatus according to one embodiment of the present invention, FIG. 4 is a rear view of the drive cup of the pipe inspection apparatus according to one embodiment of the present invention, and FIG. 5 is an enlarged cross-sectional view of a front guide part and a rear guide part of the pipe inspection apparatus according to one embodiment of the present invention.

Referring to FIGS. 1 to 5, a pipe inspection apparatus 1000 is configured to travel along the inside of a pipe due to a pressure of a fluid flowing in the pipe and may include a moving body part 100, a drive cup 200, a front guide part 300, a rear guide part 400, an elastic part 500, and an elastic part connecting shaft 600.

The moving body part 100 is a part forming a body of the pipe inspection apparatus 1000 and may have a size and a shape to move while inserted into the pipe. For example, the moving body part 100 may have a cylindrical shape in which a space is formed.

Various components, such as a leak flux detection device, a data collection device, a communication device, a pipe fault diagnosis device, a battery, a camera, and various sensors, may be provided inside and/or outside of the moving body part 100 to inspect the inside of the pipe while traveling in the pipe. In addition, the moving body part 100 may further include at least one odometer formed to extend towards an inner wall of the pipe, a communication unit for providing direct connection or connection through a network with inner and/or outer components, a program for performing an operation of the pipe inspection apparatus 1000, a memory for storing data for performing the operation. However, the present invention is not limited thereto, and various shapes and components may be applied to the moving body part 100 according to an embodiment of the present invention.

In the embodiment, the moving body part 100 may be provided as one or more moving body parts 100. When the moving body part 100 is provided as a plurality of moving body parts 100, a front side and/or rear side of the moving body part 100 may be connected to the other moving body parts 100 through shaft connecting members such as universal joints. For example, a front moving body part 100 may be equipped with a drive cup 200 and the like to serve as a propellant in the pipe, and another moving body part 100 behind the front moving body part 100 may be equipped with an apparatus necessary for pipe inspection, such as a leak flux detection device, and may serve to inspect the inside of the pipe. However, the present invention is not limited thereto.

In the embodiment, one or more rotary shaft connecting parts 110 may be provided on an outer circumferential surface of the moving body part 100. The front guide part 300, which will be described below, may be rotatably connected to the rotary shaft connecting part 110 and may rotate according to changes in an inner diameter and/or shape of the pipe.

The drive cup 200 may be disposed on an outer surface of the moving body part 100, and the moving body part 100 may travel in the pipe due to a pressure of a fluid flowing in the pipe. For example, the drive cup 200 may be formed to extend from the outer circumferential surface of the moving body part 100 toward the inner wall of the pipe to be in contact with the inner wall of the pipe so as to seal between the pipe inspection apparatus 1000 and the inner wall of the pipe. Accordingly, a pressure of the fluid behind the pipe inspection apparatus 1000 may become relatively greater than a pressure of the fluid in front thereof to generate a driving force for moving the pipe inspection apparatus 1000 due to a pressure difference in the fluid between front and rear sides thereof.

In the embodiment, the drive cup 200 may be provided as one drive cup 200 or a plurality of drive cups 200. In the case of the plurality of drive cups 200, the drive cups 200 may be disposed on the outer surface of the moving body part 100 to be spaced apart from each other in a longitudinal direction. Accordingly, the sealing performance between the pipe inspection apparatus 1000 and the inner wall of the pipe can be improved. However, the present invention is not limited thereto.

In the embodiment, at least a part of the drive cup 200 may be formed of an elastic material. Accordingly, when the pipe inspection apparatus 1000 travels in the pipe, even in a case in which the inner diameter of the pipe is changed or the pipe is deformed into a curved pipe, the drive cup 200 may be elastically deformed to be in contact with the inner wall of the pipe. To this end, the drive cup 200 may be formed of a urethane material having elasticity and sufficient durability and abrasion resistance to withstand damage caused by being in contact with the inner wall of the pipe. However, the present invention is not limited thereto, and any of various materials such as silicone, neoprene, polyurethane, and thermoplastic elastomer may be applied thereto according to an embodiment of the present invention.

In the embodiment, the drive cup 200 may include a coupling part 210 coupled to a circumference of the moving body part 100, a plurality of body parts 220 extending radially rearward and outward from the coupling part 210, and a plurality of folding parts 230 disposed between and connected to the plurality of body parts 220.

In the embodiment, the coupling part 210 may serve to fix the drive cup 200 to the moving body part 100 and may be formed in a shape corresponding to an exterior of the moving body part 100. For example, when the moving body part 100 has the cylindrical shape, the coupling part 210 may be formed in an annular shape. Accordingly, the drive cup 200 and the moving body part 100 may be coupled by inserting at least a part of the moving body part 100 into the coupling part 210. In this case, at least one fixing part 211 for coupling with the moving body part 100 may be formed on an inner side of the coupling part 210. For example, a fixing part holder 120 may be formed on the outer circumferential surface of the moving body part 100 so that the fixing part 211 is coupled to the fixing part holder 120. In this case, at least one fixing hole 212 may be formed in the fixing part 211, and a coupling member such as a bolt or pin may be coupled to the fixing hole 212 and the fixing part holder 120 to fix the drive cup 200 to the moving body part 100. However, the present invention is not limited thereto, and any of various coupling methods may be applied thereto according to an embodiment of the present invention.

In the embodiment, the body part 220 may receive an external force from the front guide part 300 and/or the rear guide part 400 and rotate with respect to the moving body part 100. In this case, the front guide part 300 may be coupled to a front surface of the body part 220, and the rear guide part 400 may be coupled to a rear surface of the body part 220. Accordingly, an external force applied to the front guide part 300 and/or the rear guide part 400 while the inner diameter and/or the shape of the pipe change may be transmitted to the body part 220, and then the body part 220 may rotate with respect to the moving body part 100.

In the embodiment, a connecting hole 221 for coupling of the front guide part 300 and/or the rear guide part 400 may be formed in one region of the body part 220. For example, as a coupling member such as a bolt or pin is inserted into the connecting hole 221, the front guide part 300 and/or the rear guide part 400 may be coupled to the body part 220. In this case, in order to easily transmit an external force between the front guide part 300 and the rear guide part 400, the front guide part 300 and the rear guide part 400 may be connected to each other using the coupling member inserted into the connecting hole 221. However, the present invention is not limited thereto, and any of various coupling methods may be applied thereto according to an embodiment of the present invention.

In the embodiment, the folding parts 230 may change a distance between body parts 220. Specifically, the folding parts 230 may include a first folding part 231 and a second folding part 232 extending rearward from two adjacent body parts 220. In this case, the first folding part 231 and the second folding part 232 may be coupled to fold forward. When the inner diameter of the pipe is reduced, while a distance between the first folding part 231 and the second folding part 232 is reduced (that is, the distance between two adjacent body parts 220 is reduced), the body parts 220 may rotate toward the moving body part 100 to reduce a diameter of the drive cup 200. In addition, when the inner diameter of the pipe increases, while the distance between the first folding part 231 and the second folding part 232 increases (that is, the distance between the adjacent two adjacent body parts 220 increases), the body part 220 may rotate toward the pipe to increase the diameter of the drive cup 200. Accordingly, even when the inner diameter and/or shape of the pipe change, a sealing state between the pipe inspection apparatus 1000 and the inner wall of the pipe can be maintained.

In the embodiment, an end portion of the folding part 230 and an edge of the body part 220 may protrude outward more than the front guide part 300 and the rear guide part 400. Accordingly, in a state in which the front guide part 300 and the rear guide part 400 are in contact with the inner wall of the pipe, a state in which protruding portions of the end portion of the folding part 230 and the edge of the body part 220 are elastically deformed to be in close contact with the inner wall of the pipe is maintained, and thus the sealing state between the pipe inspection apparatus 1000 and the inner wall of the pipe can be maintained.

In the embodiment, end portions of the first folding part 231 and the second folding part 232 may protrude outward more than the edge of the body part 220. As the end portion of the folding part 230 protrudes more than the edge of the body part 220, contact between the end portion of the folding part 230 and the inner wall of the pipe may be maintained while the folding part 230 is folded by an external force to prevent the degradation of sealing performance due to separation between the folding part 230 and the inner wall of the pipe. However, the present invention is not limited thereto, and the folding part 230 may be formed in any of various shapes according to an embodiment of the present invention.

In the embodiment, a first deforming part 240 recessed outward from one region to have a predetermined length may be formed between front surfaces of the first folding part 231 and the second folding part 232. Accordingly, since a thickness of the first deforming part 240 is smaller than a thickness of the first folding part 231 and a thickness of the second folding part 232, the first folding part 231 and the second folding part 232 can be easily folded or unfolded around the first deforming part 240.

In the embodiment, a second deforming part 250 recessed outward from one region to have a predetermined length may be formed between rear surfaces of the folding part 230 and the body part 220. Accordingly, a thickness of the second deforming part 250 may be smaller than a thickness of the body part 220 and/or a thickness of the folding part 230, and when the first folding part 231 and the second folding part 232 are folded or unfolded, the distance between the body parts 220 can be easily changed by the second deforming part 250.

In the embodiment, the coupling part 210, the body part 220, and the folding part 230 may be formed to have different hardness. For example, the coupling part 210 may be formed to have hardness, which does not allow elastic deformation, and coupled to the moving body part 100, the folding part 230 may be formed to have hardness which allows folding or elastic deformation and maintains a state in which the folding part 230 is in contact with the inner wall of the pipe when the moving body part 100 travels, and the body part 220 may be formed to have hardness which allow less deformation to support the front guide part 300 and the rear guide part 400. However, the present invention is not limited thereto, and the coupling part 210, the body part 220, and the folding part 230 may be formed of different materials or to have different thicknesses according to an embodiment of the present invention.

The front guide part 300 may be disposed on a front portion of the drive cup 200, and at least a part of the front guide part 300 may be in contact with the pipe to support the moving body part 100. In addition, the front guide part 300 may rotate in respond to changes in the diameter and/or the shape of the pipe to transmit an external force to the drive cup 200 or rotate by receiving an external force from the drive cup 200.

In the embodiment, the front guide part 300 may be provided as one or more front guide parts 300. For example, a plurality of front guide parts 300 may have a structure to be spaced apart radially from each other while connecting the moving body part 100 and the drive cup 200 and rotate with respect to the moving body part 100 and may be in contract with the inner wall of the pipe in any of various directions.

In the embodiment, the front guide part 300 may include a rotary shaft 310, a front wheel 320, and a front support shaft 330. The rotary shaft 310 may serve to support the moving body part 100 and rotate according to changes in the inner diameter and/or the shape of the pipe. Specifically, one end of the rotary shaft 310 may be rotatably connected to the rotary shaft connecting part 110 provided on the outer circumferential surface of the moving body part 100, and the other end thereof may be disposed to face the inner wall of the pipe to rotate with respect to the moving body part 100. For example, the rotary shaft 310 may have a shape in which a plurality of plates having a predetermined width and a predetermined thickness are disposed to face each other or have a bar shape. However, the present invention is not limited thereto, and the rotary shaft 310 may have any of various shapes according to an embodiment of the present invention.

In addition, the front wheel 320 may be connected to the other end of the rotary shaft 310, rotate while in contact with the inner wall of the pipe, and prevent the rotary shaft 310 from being in direct contact with the inner wall of the pipe. For example, the front wheel 320 may be connected to a front wheel connecting part (no drawing number) formed on the other end of the rotary shaft 310, and a rotary shaft such as a pin may be coupled to pass through a center of the front wheel 320 and the front wheel connecting part so that the front wheel 320 is rotatably coupled in contact with the inner wall of the pipe. Accordingly, when the pipe inspection apparatus 1000 travels, a frictional force at the front side of the drive cup 200 can be reduced by the front wheel 320.

In addition, the front support shaft 330 may transmit an external force received by the front wheel 320 to the drive cup 200, or transmit an external force received by a rear wheel 420 and an elastic force of the drive cup 200 to the rotary shaft 310. Specifically, one end of the front support shaft 330 may be connected to the front wheel 320, and the other end thereof may be connected to a front surface of the drive cup 200 (particularly, the front surface of the body part 220). In this case, one end of the front support shaft 330 may be rotatably connected to a connecting part of the front wheel 320 described above. Accordingly, when the rotary shaft 310 rotates toward the moving body part 100, the front support shaft 330 may press the body part 220 so that the drive cup 200 is elastically deformed and/or folded rearward. When the front support shaft 330 receives an external force from the drive cup 200, the received external force may be transmitted to the rotary shaft 310 so that the rotary shaft 310 rotates toward the inner wall of the pipe.

In the embodiment, a front coupling plate 331 which is fixedly in close contact with the front surface of the body part 220 may be formed on the other end of the front support shaft 330. An external force received from the rotary shaft 310 may be transmitted to a wider region of the drive cup 200 to easily elastically deform and/or fold the drive cup 200. In this case, since one end of the front support shaft 330 is rotatably connected to the front wheel 320 and/or the other end of the rotary shaft 310, a state in which the front coupling plate 331 is in close contact with the front surface of the body part 220 can be maintained even when an inclination of the body part 220 with respect to the moving body part 100 is changed.

The rear guide part 400 may be disposed on a rear portion of the drive cup 200 so that at least a part of the rear guide part 400 may be in contact with the pipe and transmit an external force to the drive cup 200 by rotating with respect to the moving body part 100 in response to changes in the inner diameter and/or the shape of the pipe or rotate with respect to the moving body part 100 in response to folding and/or elastic deformation of the drive cup 200.

In the embodiment, the rear guide part 400 may be provided as one or more rear guide parts 400. For example, a plurality of rear guide parts 400 may be disposed on rear surfaces of the plurality of body parts 220 of the drive cup 200 to be in contact with the inner wall of the pipe in various directions.

In the embodiment, the rear guide part 400 may include a rear support shaft 410 and a rear wheel 420. The rear support shaft 410 may serve to support the drive cup 200. Specifically, one end of the rear support shaft 410 may be connected to a rear surface of the drive cup 200 (particularly, the rear surface of the body part 220), and the other end thereof may be disposed to face the inner wall of the pipe. For example, the rear support shaft 410 may have a shape in which a plurality of plates having a predetermined width and a predetermined thickness are disposed to face each other or have a bar shape. However, the present invention is not limited thereto, and the rear support shaft 410 may have any of various shapes according to an embodiment of the present invention. In addition, the rear wheel 420 may be connected to the other end of the rear support shaft 410, rotate in contact with the inner wall of the pipe, and prevent the rear support shaft 410 from being in direct contact with the inner wall of the pipe. For example, the rear wheel 420 may be connected to a rear wheel connecting part (no drawing number) formed on the other end of the rear support shaft 410, and a rotary shaft such as a pin may be coupled to pass through a center of the rear wheel 420 and the rear wheel connecting part so that the rear wheel 420 is rotatably coupled in contact with the inner wall of the pipe. Accordingly, when the pipe inspection apparatus 1000 travels, a frictional force at the rear side of the drive cup 200 can be reduced by the rear wheel 420.

In the embodiment, one end of the rear support shaft 410 may be fixed to the rear surface of the body part 220. For example, a rear coupling plate 411 which is fixedly in close contact with the rear surface of the body part 220 may be formed on one end of the rear support shaft 410. Accordingly, when an inclination of the body part 220 with respect to the moving body part 100 changes, the inclination of the rear coupling plate 411 with respect to the moving body part 100 may change in response to the change to rotate the rear support shaft 410.

In the embodiment, a distance from the moving body part 100 to a point at which the rear wheel 420 and/or the front wheel 320 is in contact with the inner wall of the pipe may correspond to a distance from the moving body part 100 to the inner wall of the pipe. To this end, the rear support shaft 410 may be formed to extend toward the inner wall of the pipe at a predetermined angle with respect to the body part 220 (or rear coupling plate 411). Accordingly, a state in which the rear wheel 420 is in contact with the pipe can be maintained even when the rear guide part 400 rotates in conjunction with rotation of the body part 220.

The elastic part 500 may be disposed between the front guide part 300 and the moving body part 100 to elastically support at least a part of the front guide part 300.

In the embodiment, one end of the elastic part 500 may be connected to the outer surface of the moving body part 100, and the other end thereof may be connected to the front guide part 300 (particularly, the rotary shaft 310). For example, the elastic part connecting shaft 600 may be provided on the outer surface of the moving body part 100, an elastic part fixing part (unnumbered) may be provided inside the rotary shaft 310, and the elastic part 500 may be disposed between the elastic part connecting shaft 600 and the elastic part fixing part to elastically support the front guide part 300. Accordingly, after the front wheel 320 and the rear wheel 420 rotate toward the moving body part 100, the front wheel 320 and the rear wheel 420 may recover their position by rotating toward the pipe by at least one of elastic recovery of the elastic part 500 and elastic recovery of the drive cup 200. Accordingly, when a support force of the drive cup 200 is insufficient due to a weight or a driving speed of the moving body part 100, a rapid change in the inner wall of the pipe, or the like, the elastic part 500 may supplement the support force of the drive cup 200.

One end of the elastic part connecting shaft 600 may be rotatably coupled to the moving body part 100, and the other end thereof may be connected to the elastic part 500. Accordingly, when the front guide part 300 (particularly, the rotary shaft 310) rotates, the elastic part connecting shaft 600 may rotate in conjunction with the front guide part 300 so that the elastic part 500 is compressed and recovered in an axial direction of the elastic part connecting shaft 600. Accordingly, a loss of an elastic force of the elastic part 500 can be minimized. In addition, the elastic part 500 can be prevented from deforming in a direction different from a compression and recovery direction (that is, an axial direction of the elastic part connecting shaft 600) to improve durability of the elastic part 500.

In the embodiment, the front guide part 300 and the rear guide part 400 may recover their positions by rotating toward the pipe due to an elastic recovery force of the drive cup 200 without the elastic part 500 and the elastic part connecting shaft 600. To this end, the drive cup 200 (particularly, the body part 220 and the folding part 230) may be designed to have any of various thicknesses and hardness in consideration of a driving speed of the moving body part 100, a shape of the pipe, and the like so that the moving body part 100 is supported by only elastic self-recovery force of the drive cup 200. Accordingly, a state in which the front wheel 320 and/or the rear wheel 420 are in contact with the inner wall of the pipe can be maintained without any apparatus which assists the drive cup 200.

The pipe inspection apparatus illustrated in FIGS. 1 to 5 is exemplary, and any of various structures may be applied thereto according to an embodiment to which the present invention is applied.

Figure 6:
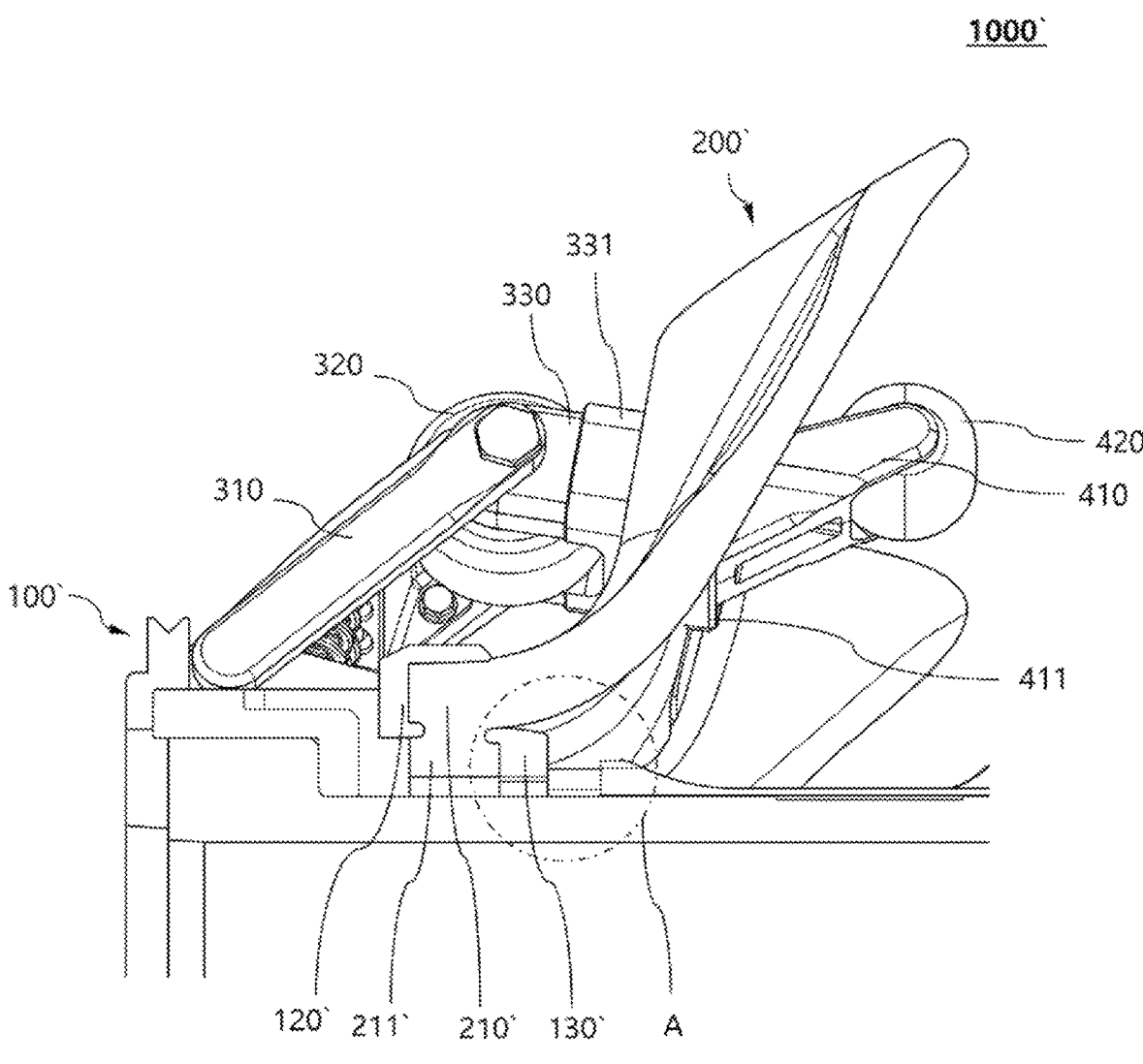
FIG. 6 is a view for exemplarily describing a coupling structure of the moving body part and the drive cup of the pipe inspection apparatus according to one embodiment of the present invention.
Figure 7:
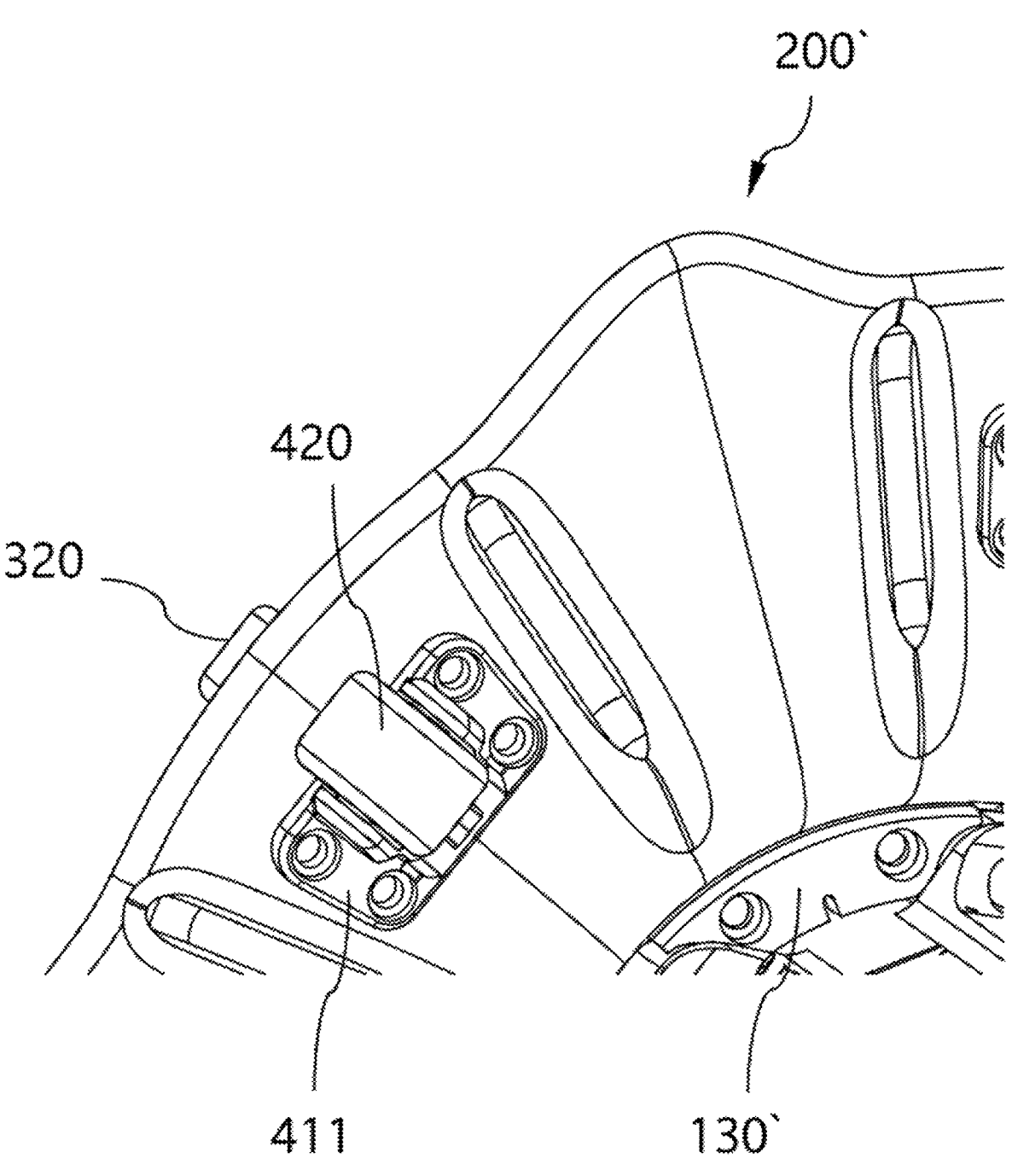
FIG. 7 is a bottom view of portion A of FIG. 6.

FIG. 6 is a view for exemplarily describing a coupling structure of the moving body part and the drive cup of the pipe inspection apparatus according to one embodiment of the present invention, and FIG. 7 is a bottom view of portion A of FIG. 6.

Components except a fixing part and a support of FIGS. 6 and 7 will be the same as those of the pipe inspection apparatus in FIGS. 1 to 5, and the redundant description will be omitted below.

In the embodiment, a support 130' which supports a coupling part 210' may be disposed on a rear surface of the coupling part 210' (particularly, a rear surface of the fixing part 211'). For example, in a state in which the coupling part 210' is coupled to a fixing part holder 120', the support 130' may be formed to protrude from an outer circumferential surface of a moving body part 100' and disposed in close contact with the rear surface of the coupling part 210' to support the coupling part 210'. In this case, the support 130' may be fixed to the coupling part 210' and/or the fixing part 211' using a support member such as a bolt or pin. However, the present invention is not limited thereto, and any of various coupling methods may be applied thereto according to an embodiment of the present invention.

As described above, since the support 130' is disposed on the rear surface of the coupling part 210', a drive cup 200' and the moving body part 100' can be more firmly coupled, and problems that the drive cup 200' is pushed rearward or separated from the fixing part holder 120' by an external force can be prevented when a pipe inspection apparatus 1000' travels in the pipe.

The pipe inspection apparatus illustrated in FIGS. 6 and 7 is exemplary, and any of various structures may be applied thereto according to an embodiment to which the present invention is applied.

The exemplary embodiments have been disclosed with reference to the drawings and the specification as described above. Although the specific terms have been used in this specification, the terms are used to only describe the present invention and not to limit the meanings or the scope of the present invention defined by the claims. Therefore, it will be understood by those skilled in the art which various modifications and equivalent other example embodiments may be made. Therefore, the scope of the present invention is defined by the technical spirit of the appended claims.

What is claimed is:

1. A pipe inspection apparatus comprising:
a moving body part to travel in a pipe;
at least one drive cup disposed on an outer surface of the moving body part and configured to allow the moving body part to travel along an inside of the pipe due to a pressure of a fluid flowing in the pipe;
at least one front guide part disposed on a front portion of the drive cup and including a front wheel that brings into contact with the pipe; and
at least one rear guide part disposed on a rear portion of the drive cup and including a rear wheel that brings into contact with the pipe,
wherein the drive cup includes:
a coupling part coupled to a circumference of the moving body part;
a plurality of body parts which extend radially rearward and outward from the fixing part and of which a front surface is coupled to the front guide part and a rear surface is coupled to the rear guide part; and
a plurality of folding parts disposed between and connected to the plurality of body parts and configured to change a distance between the body parts.

2. The pipe inspection apparatus of claim 1, wherein the front guide part includes:
a rotary shaft of which one end is rotatably connected to the moving body part and the other end is connected to the front wheel; and
a front support shaft of which one end is connected to the front wheel and the other end is connected to a front surface of the drive cup.

3. The pipe inspection apparatus of claim 2, wherein the rear guide part includes:
a rear support shaft of which one end is connected to a rear surface of the drive cup and the other end is connected to the rear wheel.

4. The pipe inspection apparatus of claim 1, wherein at least a part of the drive cup is formed of an elastic material.

5. The pipe inspection apparatus of claim 4, wherein, when an external force is applied to the front wheel:
the front guide part rotates toward the moving body part to elastically deform the at least a part of the drive cup; and
the rear guide part rotates toward the pipe so that the front wheel and the rear wheel bring into contact with the pipe.

6. The pipe inspection apparatus of claim 5, wherein the front wheel and the rear wheel are position-restored by being rotated toward the pipe due to elastic recovery of the drive cup.

7. The pipe inspection apparatus of claim 5, further comprising an elastic part which is disposed between the front guide part and the moving body part and supports at least a part of the front guide part,
wherein the front wheel and the rear wheel are position-restored by being rotated toward the pipe due to at least one of elastic recovery of the elastic part and elastic recovery of the drive cup.

8. The pipe inspection apparatus of claim 4, wherein, when an external force is applied to the rear wheel:
the rear guide part rotates toward the moving body part to elastically deform the at least a part of the drive cup; and
the front guide part rotates toward the pipe so that the rear wheel and the front wheel bring into contact with the pipe.

9. The pipe inspection apparatus of claim 8, wherein the front wheel and the rear wheel are position-restored by being rotated toward the pipe due to elastic recovery of the drive cup.

10. The pipe inspection apparatus of claim 8, further comprising an elastic part which is disposed between the front guide part and the moving body part and supports at least a part of the front guide part,
wherein the front wheel and the rear wheel are position-restored by being rotated toward the pipe due to at least one of elastic recovery of the elastic part and elastic recovery of the drive cup.

11. The pipe inspection apparatus of claim 1, wherein:
the folding parts include a first folding part and a second folding part extending rearward from two adjacent body parts;
the first folding part and the second folding part are coupled to fold forward; and
end portions of the first folding part and the second folding part protrude outward more than edges of the body parts.

12. The pipe inspection apparatus of claim 11, wherein:
a first deforming part recessed outward from one region to have a predetermined length is formed between front surfaces of the first folding part and the second folding part; and
a second deforming part recessed outward from one region to have a predetermined length is formed between rear surfaces of the folding part and the body part.

* * * * *